US010813152B2

(12) United States Patent
Fukuta et al.

(10) Patent No.: US 10,813,152 B2
(45) Date of Patent: *Oct. 20, 2020

(54) USER TERMINAL, PROCESSOR, AND BASE STATION

(71) Applicant: KYOCERA Corporation, Kyoto (JP)

(72) Inventors: Noriyoshi Fukuta, Inagi (JP); Kugo Morita, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,169

(22) Filed: Apr. 8, 2019

(65) Prior Publication Data

US 2019/0239267 A1  Aug. 1, 2019

Related U.S. Application Data

(63) Continuation of application No. 15/844,677, filed on Dec. 18, 2017, now Pat. No. 10,299,306, which is a (Continued)

(30) Foreign Application Priority Data

Jun. 27, 2013 (JP) ................................ 2013-135607

(51) Int. Cl.
*H04W 76/14* (2018.01)
*H04W 72/04* (2009.01)
(Continued)

(52) U.S. Cl.
CPC ............. *H04W 76/14* (2018.02); *H04L 29/06* (2013.01); *H04W 28/18* (2013.01); *H04W 72/04* (2013.01);
(Continued)

(58) Field of Classification Search
CPC combination set(s) only.
See application file for complete search history.

(56) References Cited

U.S. PATENT DOCUMENTS 6,683,851 B1   1/2004  Willkie et al.
9,185,697 B2 * 11/2015  Kuchibhotla ........... H04W 4/90
(Continued)

FOREIGN PATENT DOCUMENTS

JP    2010-183343 A    8/2010
WO   2010/102668 A1    9/2010
(Continued)

OTHER PUBLICATIONS

International Search Report; issued in PCT/JP2014/066709; dated Sep. 22, 2014.
(Continued)

*Primary Examiner* — Hong S Cho
(74) *Attorney, Agent, or Firm* — Studebaker & Brackette PC

(57) ABSTRACT

A communication control method, user equipment and apparatus thereof include transmitting, to a base station by a user equipment, first information on a priority of a data pack to be transmitted from the user equipment via direct communication in which the data packet is transmitted to another user equipment without passing through the base station. The first information assists the base station in scheduling transmission resources for the direct communication. The method, user equipment and apparatus also include transmitting a request for requesting transmission resources for the direct communication to the base station by the user equipment, and receiving by the user equipment from the base station second information indicating transmission resources for the direct communication scheduled by the base station.

3 Claims, 11 Drawing Sheets

Related U.S. Application Data continuation of application No. 14/901,255, filed as application No. PCT/JP2014/066709 on Jun. 24, 2014, now Pat. No. 9,848,455.

(51) Int. Cl.

| | | |
|---|---|---|
| *H04W 28/18* | (2009.01) | |
| *H04W 92/18* | (2009.01) | |
| *H04L 29/06* | (2006.01) | |
| *H04W 76/25* | (2018.01) | |
| *H04W 76/38* | (2018.01) | |

(52) U.S. Cl.
CPC ............ *H04W 76/25* (2018.02); *H04W 76/38* (2018.02); *H04W 92/18* (2013.01)

(56) References Cited

U.S. PATENT DOCUMENTS

| | | | |
|---|---|---|---|
| 9,357,573 | B2 | 5/2016 | Hwang et al. |
| 9,380,623 | B2* | 6/2016 | Kim .................. H04W 40/246 |
| 9,634,806 | B2* | 4/2017 | Damnjanovic ..... H04W 52/346 |
| 9,854,044 | B2 | 12/2017 | Kazmi et al. |
| 2009/0029708 | A1 | 1/2009 | Iwata |
| 2009/0168793 | A1 | 7/2009 | Fox et al. |
| 2010/0014430 | A1* | 1/2010 | Oka ...................... H04L 1/1854 370/242 |
| 2010/0197312 | A1 | 8/2010 | Ohara |
| 2010/0240385 | A1 | 9/2010 | Lohr et al. |
| 2013/0051326 | A1 | 2/2013 | Jeyatharan et al. |
| 2013/0157679 | A1 | 6/2013 | Van Phan et al. |
| 2013/0223398 | A1* | 8/2013 | Li ...................... H04W 72/085 370/329 |
| 2013/0242909 | A1 | 9/2013 | Kim |
| 2013/0288668 | A1 | 10/2013 | Pragada et al. |
| 2014/0160950 | A1 | 6/2014 | Vasudevan et al. |
| 2015/0094064 | A1 | 4/2015 | Lei et al. |
| 2015/0141030 | A1 | 5/2015 | Basu-Mallick et al. |
| 2015/0156793 | A1* | 6/2015 | Dai .................. H04W 72/1236 370/329 |

FOREIGN PATENT DOCUMENTS

| | | |
|---|---|---|
| WO | 2011/147468 A1 | 12/2011 |
| WO | 2012/099902 A1 | 7/2012 |

OTHER PUBLICATIONS

Written Opinion; issued in PCT/JP2014/066709; dated Sep. 22, 2014.
3rd Generation Partnership Project; Technical Specification Group Services and System Aspects; Feasibility study for Proximity Services (ProSe) (Release 12), 3GPP TR 22.803 V12.1.0 (Mar. 2013), 3GPP Organizational Partners, 2013.
Physical layer options for D2D communication; 3GPP TSG RAN WG1 Meeting #73, Fukuoka, Japan, May 20-24, 2013; R1-131865.
On D2D communication; 3GPP TSG RAN WG1 Meeting #73, Fukuoka, Japan, May 20-24, 2013; R1-131897.
Extended European Search Report (EESR) dated Feb. 1, 2017 from corresponding EP Appl No. 14816846.1, 9 pp.
An Office Action issued by the Japanese Patent Office dated Mar. 13, 2018, which corresponds to Japanese Patent Application No. 2017-211716 and is related to U.S. Appl. No. 15/844,677; with English language concise explanation.

\* cited by examiner

FIG. 8

| QCI | Resource Type | Priority | Packet Delay Budget | Packet Error Loss Rate | Example Services |
|---|---|---|---|---|---|
| 1 | GBR | 2 | 100ms | $10^{-2}$ | Conversational Voice |
| 2 | | 4 | 150ms | $10^{-3}$ | Conversational Video (Live Streaming) |
| 3 | | 3 | 50ms | $10^{-3}$ | Real Time Gaming |
| 4 | | 5 | 300ms | $10^{-6}$ | Non-Conversational Video (Buffered Streaming) |
| 5 | Non-GBR | 1 | 100ms | $10^{-6}$ | IMS Signalling |
| 6 | | 6 | 300ms | $10^{-6}$ | Video (Buffered Streaming) TCP-based (e.g., www, e-mail, chat, ftp, p2p file sharing, progressive video, etc.) |
| 7 | | 7 | 100ms | $10^{-3}$ | Voice, Video (Live Streaming) Interactive Gaming |
| 8 | | 8 | 300ms | $10^{-6}$ | Video (Buffered Streaming) TCP-based (e.g., www, e-mail, chat, ftp, p2p file sharing, progressive video, etc.) |
| 9 | | 9 | | | |

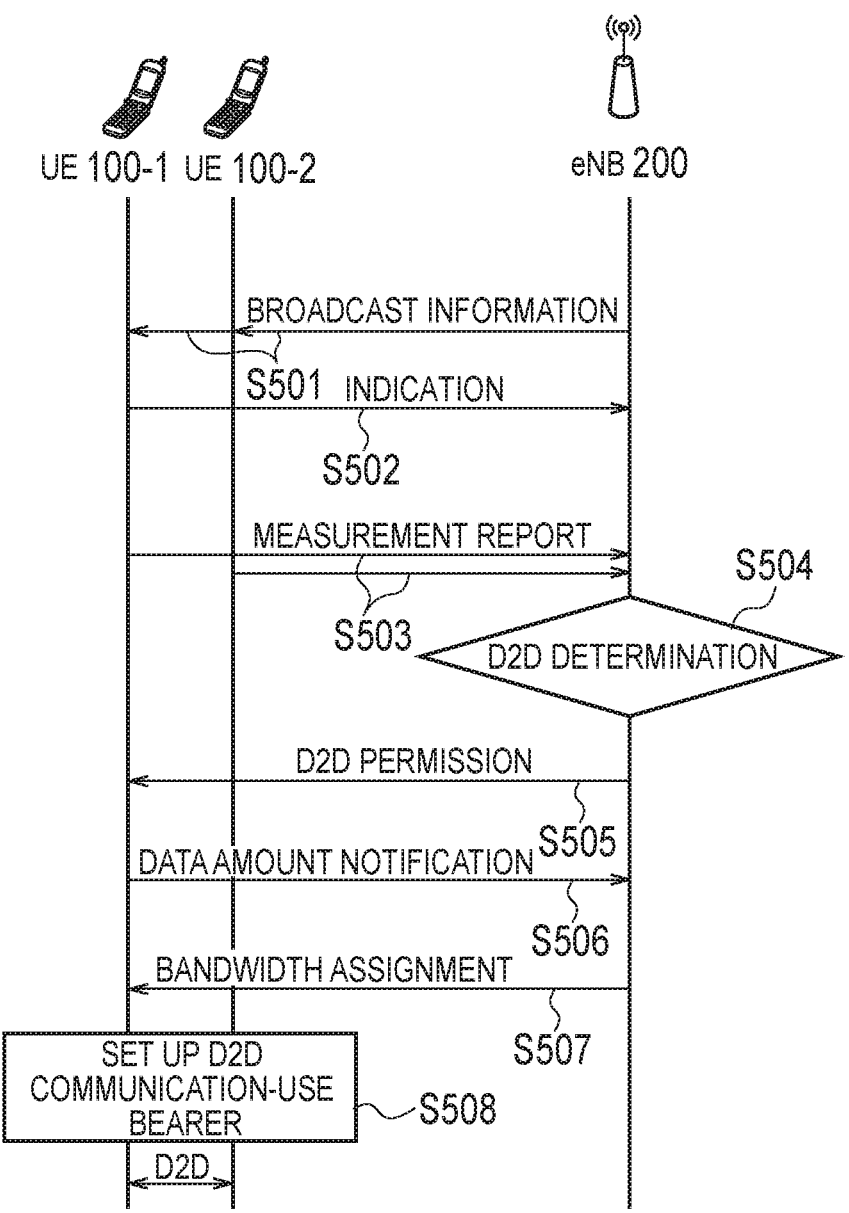

USER TERMINAL, PROCESSOR, AND BASE STATION

CROSS-REFERENCE TO RELATED APPLICATIONS

This application is a Continuation of U.S. patent application Ser. No. 15/844,677 filed Dec. 18, 2017, which is a Continuation of U.S. patent application Ser. No. 14/901,255 filed Dec. 28, 2015, which is the U.S. National Phase Application of International Application No. PCT/JP2014/066709 filed Jun. 24, 2014, and claims benefit of Japanese Patent Application No. 2013-135607 filed Jun. 27, 2013, the entire contents of which are incorporated herein by reference.

TECHNICAL FIELD

The present disclosure relates to a user terminal in a mobile communication system that supports D2D communication, a processor thereof, and a base station thereof.

BACKGROUND

In 3GPP (3rd Generation Partnership Project) which is a project aiming to standardize a mobile communication system, the introduction of device-to-device (D2D) communication is discussed as a new function after Release 12 (see Non Patent Literature 1).

In the D2D communication, a plurality of neighboring user terminals perform direct communication without passing through a base station. That is, a data path for the D2D communication does not pass through the base station. On the other hand, a data path for normal communication (cellular communication) in a mobile communication system passes through the base station.

CITATION LIST

Non Patent Literature

[NPL 1] 3GPP Technical Report "TR 22.803 V12.1.0" March 2013

SUMMARY OF THE DISCLOSURE

However, there is a problem that although there is the D2D data to be preferentially transmitted among data transmitted by D2D communication (hereinafter, referred to as D2D data), there is no mechanism in which a user terminal having D2D data to be preferentially transmitted preferentially transmits the D2D data over other user terminals.

Therefore, the present disclosure provides a communication control method, a user equipment capable of preferentially transmitting D2D data to be preferentially transmitted, and an apparatus thereof.

A communication control method according to the present disclosure comprises transmitting to a base station, by a user equipment, first information including a priority of a data packet to be transmitted from the user equipment via direct communication in which the data packet is transmitted to another user equipment without passing through the base station. The first information assists the base station in scheduling transmission resources for the direct communication. The method also comprises transmitting to the base station, by the user equipment, a request for requesting transmission resources for the direct communication, and receiving from the base station, by the user equipment, second information indicating transmission resources for the direct communication scheduled by the base station.

A user equipment according to the present disclosure comprises a transmitter configured to transmit to a base station, first information including a priority of a data packet to be transmitted from the user equipment via direct communication in which the data packet is transmitted to another user equipment without passing through the base station. The first information assists the base station in scheduling transmission resources for the direct communication. The user equipment also comprises a receiver. The transmitter is configured to transmit to the base station, a request for requesting transmission resources for the direct communication, and the receiver is configured to receive from the base station, second information indicating transmission resources for the direct communication scheduled by the base station.

An apparatus to be provided in a user equipment according to the present disclosure comprises at least one processor and a memory coupled to the at least one processor. The processor is configured to perform process of transmitting to a base station, first information including a priority of a data packet to be transmitted from the user equipment via direct communication in which the data packet is transmitted to another user equipment without passing through the base station. The first information assists the base station in scheduling transmission resources for the direct communication. The processor is configured to perform the processes of transmitting to the base station, a request for requesting transmission resources for the direct communication, and receiving from the base station, second information indicating transmission resources for the direct communication scheduled by the base station.

BRIEF DESCRIPTION OF THE DRAWINGS

FIG. 8 is a diagram for illustrating an example of a parameter that characterizes a property of D2D data.
FIG. 14 is a sequence diagram showing an operation example of a mobile communication system according to a third modification of the embodiment.

DESCRIPTION OF EMBODIMENTS

Overview of Embodiment

Figure 1:
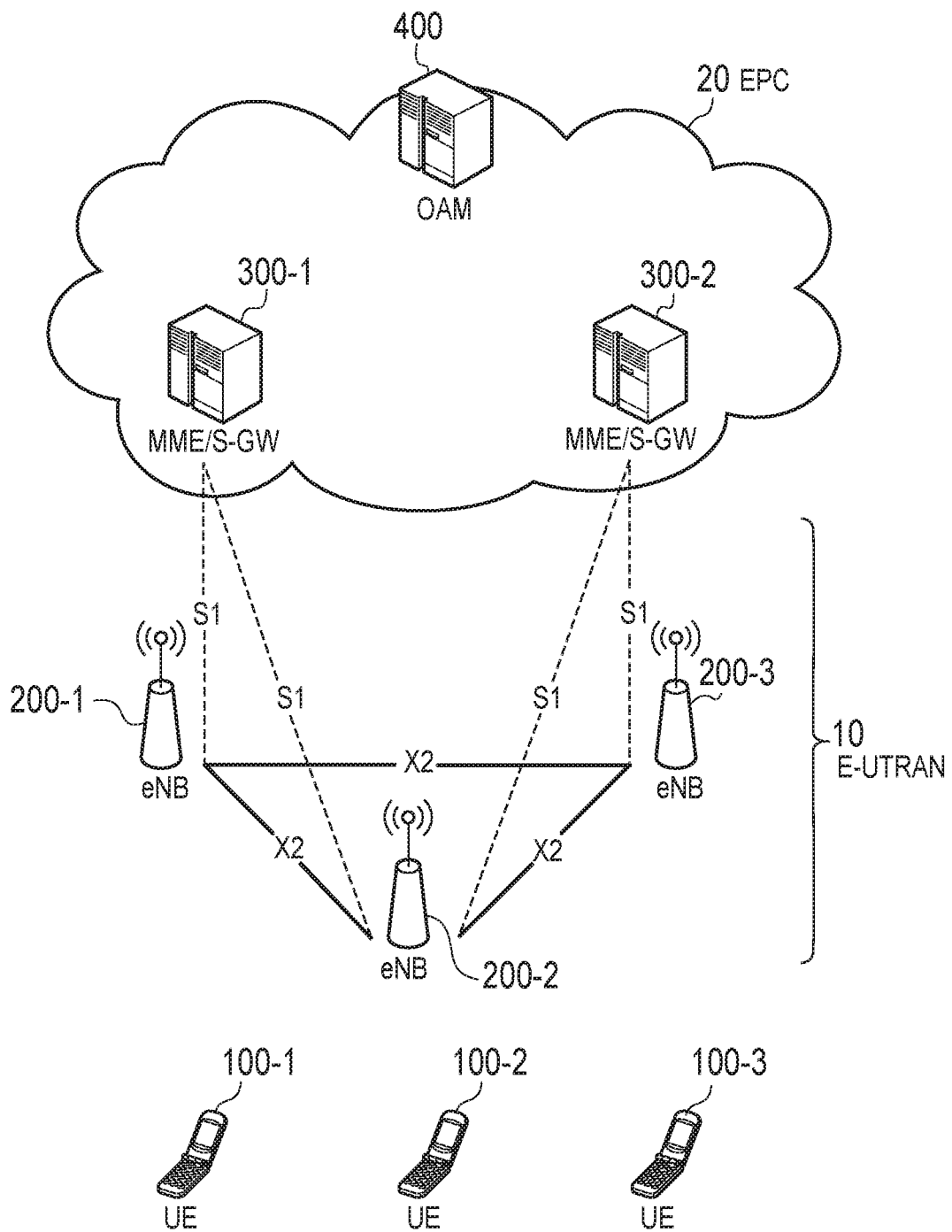
FIG. 1 is a configuration diagram of an LTE system.

A user terminal according to embodiment is a user terminal in a mobile communication system supporting D2D communication that is direct device-to-device communication. The user terminal comprises: a controller configured to establish a D2D communication bearer used for the direct D2D communication between the user terminal and other user terminal that is a partner terminal of the D2D communication, in accordance with a parameter that characterizes a property of D2D data transmitted by the D2D communication; and a transmitter configured to transmit the D2D data corresponding to the parameter via the D2D communication bearer depending on the parameter by using a radio resource assigned in accordance with the parameter.

It is noted that the above-described "D2D communication bear" corresponds to "D2D data-use bearer" recited in the embodiment.

In the embodiment, when each of the parameters of a plurality of pieces of D2D data transmitted by the D2D communication differs from one another, the controller establishes a plurality of D2D communication bearers in accordance with the parameters respectively corresponding to the plurality of pieces of D2D data.

In the embodiment, the controller further establishes a D2D control bearer used for controlling the D2D communication, and the controller performs control of transmitting and/or receiving, via the D2D control bearer, keep-alive information for confirming that a connection between the user terminal and the other user terminal is effective.

In the embodiment, the controller changes a display of a user interface of the user terminal when not receiving the keep-alive information for a predetermined period.

In the embodiment, the parameter is at least one of an identifier of a QoS class, a priority, a permitted delay time, and a permitted packet loss rate.

In the embodiment, the controller establishes, between a base station to which the user terminal is connectable and the user terminal, a radio bearer used for cellular communication that is communication via the base station, co-existing with the D2D communication bearer, and it further comprises a receiver configured to receive, via the radio bearer, information indicating the radio resource assigned by the base station in accordance with the parameter.

In another embodiment, the controller determines the parameter on the basis of at least one of past information related with the D2D data and an application used for the D2D communication.

A processor according to the embodiment is provided in a user terminal in a mobile communication system supporting D2D communication that is direct device-to-device communication. The processor executes the processes of: establishing a D2D communication bearer used for the direct D2D communication between the user terminal and other user terminal that is a partner terminal of the D2D communication, in accordance with a parameter that characterizes a property of D2D data transmitted by the D2D communication; and transmitting the D2D data corresponding to the parameter via the D2D communication bearer depending on the parameter by using a radio resource assigned in accordance with the parameter.

A base station according to the embodiment is a base station in a mobile communication system supporting D2D communication that is direct device-to-device communication. The base station comprises: a controller configured to establish a radio bearer used for cellular communication that is communication via the base station, between the base station and a user terminal configured to perform the D2D communication; and a transmitter configured to transmit a radio resource used for the D2D communication, to the user terminal via the radio bearer. The controller assigns the radio resource to the user terminal in accordance with a parameter that characterizes a property of D2D data transmitted by the D2D communication.

With reference to the accompanying drawings, the description will be provided for each embodiment when D2D communication is introduced to a cellular mobile communication system (hereinafter, an "LTE system") configured to comply with the 3GPP standards, below.

(LTE System)

FIG. 1 is a configuration diagram of an LTE system according to the present embodiment.

As shown in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 configure a network.

The UE 100 is a mobile radio communication device and performs radio communication with a cell (serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200 has a radio resource management (RRM) function, a routing function for user data, and a measurement control function for mobility control and scheduling, for example.

The EPC 20 includes MME (Mobility Management Entity)/S-GW (Serving-Gateway) 300, and OAM 400 (Operation and Maintenance). Further, the EPC 20 corresponds to a core network.

The MME is a network node that performs various mobility controls, etc., on the UE 100, and corresponds to a control station. The S-GW is a network node that performs control to transfer user data, and corresponds to a mobile switching center.

The eNB 200 is connected mutually via an X2 interface. Further, the eNB 200 is connected to the MME/S-GW 300 via an S1 interface.

The OAM 400 is a server device managed by an operator and performs maintenance and monitoring of the E-UTRAN 10.

Next, configurations of the UE 100 and the eNB 200 will be described.

Figure 2:
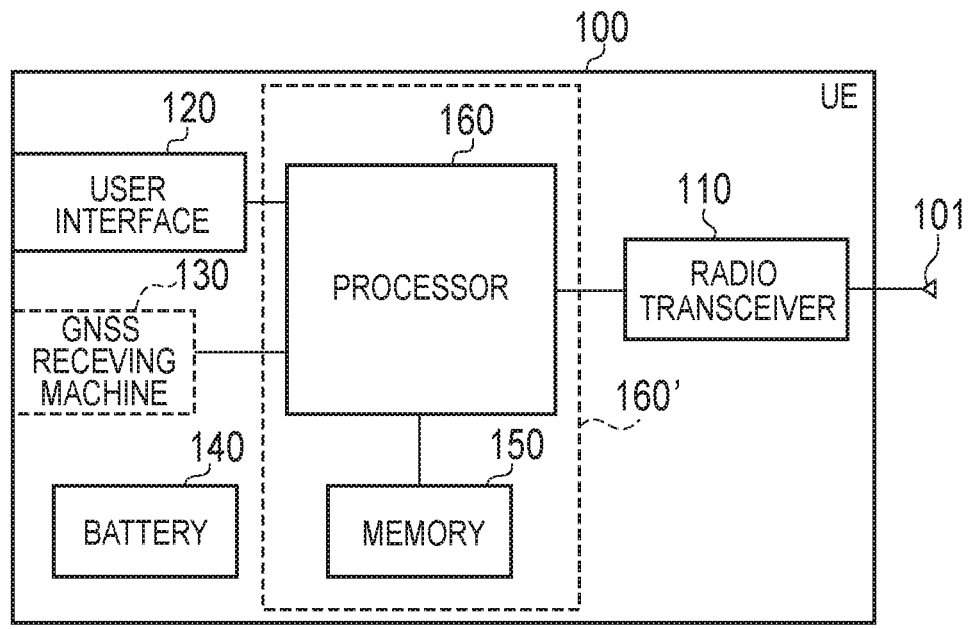
FIG. 2 is a block diagram of UE.

FIG. 2 is a block diagram of the UE 100. As shown in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller.

The UE 100 may not need to include the GNSS receiver 130. Further, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Further, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons, and the like. The user interface 120 receives an operation from a user and outputs a signal indicating a content of the operation to the processor 160.

The GNSS receiver 130 receives a GNSS signal in order to obtain location information indicating a geographical location of the UE 100, and outputs the received signal to the processor 160.

The battery 140 accumulates power to be supplied to each block of the UE 100.

The memory 150 stores a program to be executed by the processor 160 and information to be used for a process by the processor 160.

The processor 160 includes a baseband processor that performs modulation and demodulation, encoding and decoding, and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various communication protocols described later.

In the present embodiment, the controller of the UE 100 includes a radio controller that controls the radio transceiver 110 and a user interface controller that controls the user interface 120. The radio controller and the user interface controller will be described in detail, later.

Figure 3:
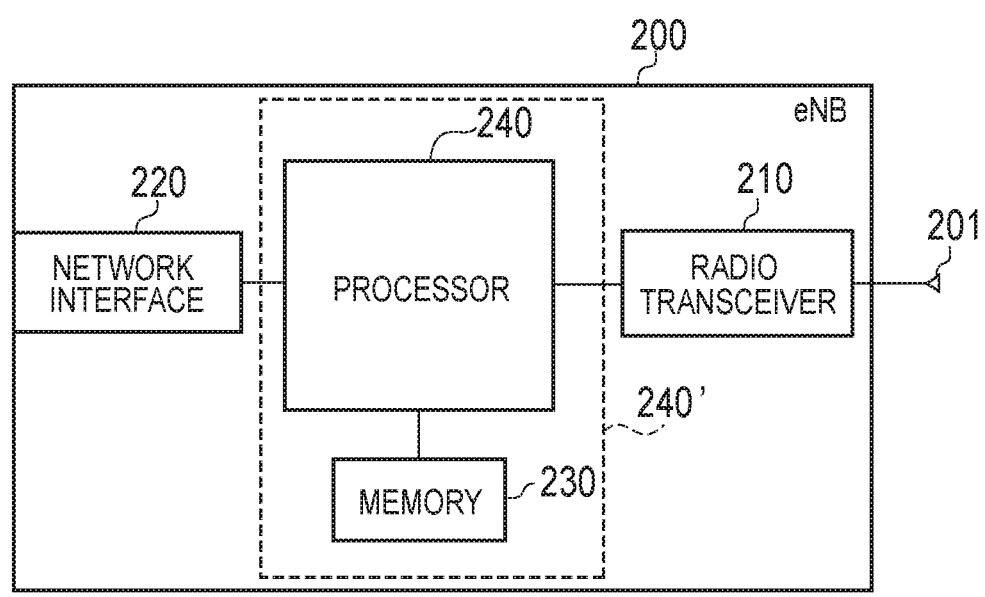
FIG. 3 is a block diagram of eNB.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 configure a controller. Further, the memory 230 may be integrally formed with the processor 240, and this set (that is, a chip set) may be called a processor 240'.

The antenna 201 and the radio transceiver 210 are used to transmit and receive a radio signal. The antenna 201 includes a plurality of antenna elements. The radio transceiver 210 converts a baseband signal output from the processor 240 into the radio signal, and transmits the radio signal from the antenna 201. Further, the radio transceiver 210 converts the radio signal received by the antenna 201 into the baseband signal, and outputs the baseband signal to the processor 240.

The network interface 220 is connected to a neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding, and the like on the baseband signal, and a CPU that performs various types of processes by executing the program stored in the memory 230. The processor 240 executes various types of processes and various communication protocols described later.

Figure 4:
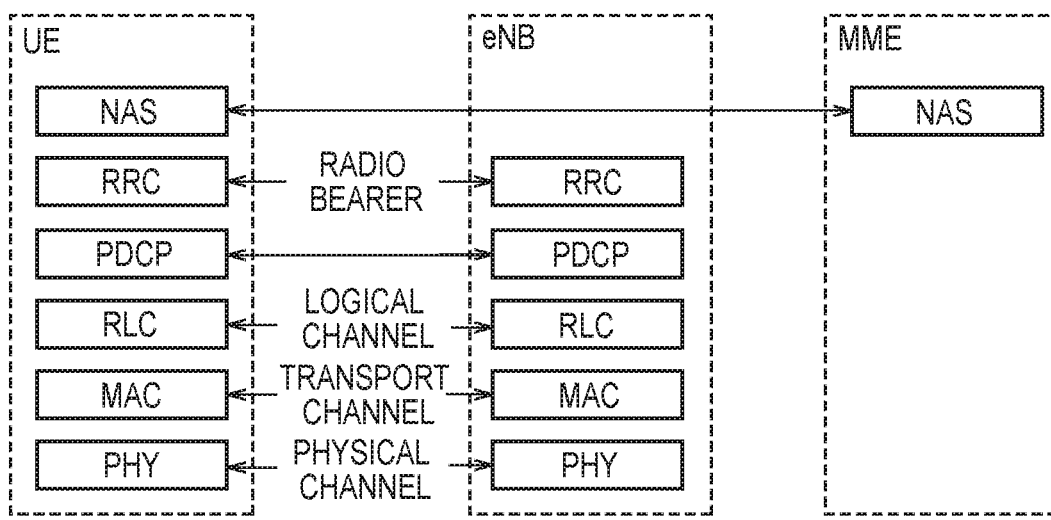
FIG. 4 is a protocol stack diagram of a radio interface in an LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes an MAC (Media Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. The physical layer provides a transmission service to an upper layer by using a physical channel. Between the physical layer of the UE 100 and the physical layer of the eNB 200, data is transmitted via the physical channel.

The MAC layer performs priority control of data, a retransmission process by a hybrid ARQ (HARQ), and the like. Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme, and the like), and a MAC scheduler to decide a resource block to be assigned.

The RLC layer transmits data to an RLC layer of a reception side by using the functions of the MAC layer and the physical layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (RRC message) for various types of settings is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

An NAS (Non-Access Stratum) layer positioned above the RRC layer performs session management, mobility management, and the like.

Figure 5:
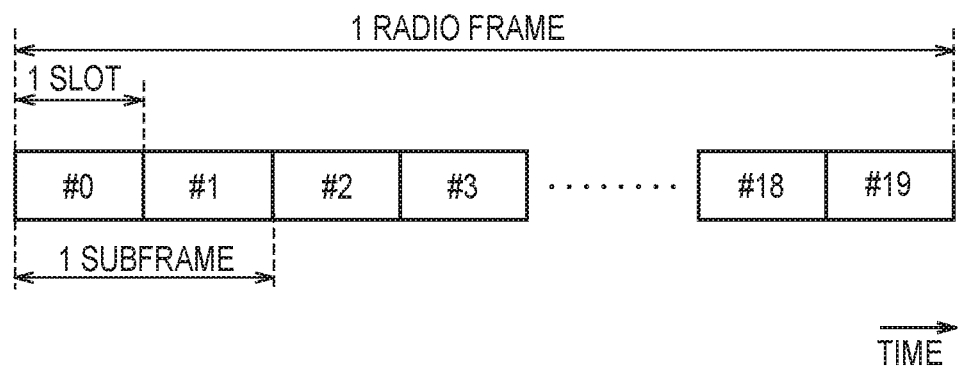
FIG. 5 is a configuration diagram of a radio frame used in an LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be specified by a resource block and a time resource can be specified by a subframe (or a slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signal (CRS) are distributed and arranged.

In the uplink, both ends in the frequency direction of each subframe are control regions mainly used as a physical uplink control channel (PUCCH). Further, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (cellular communication) in the LTE system.

Figure 6:
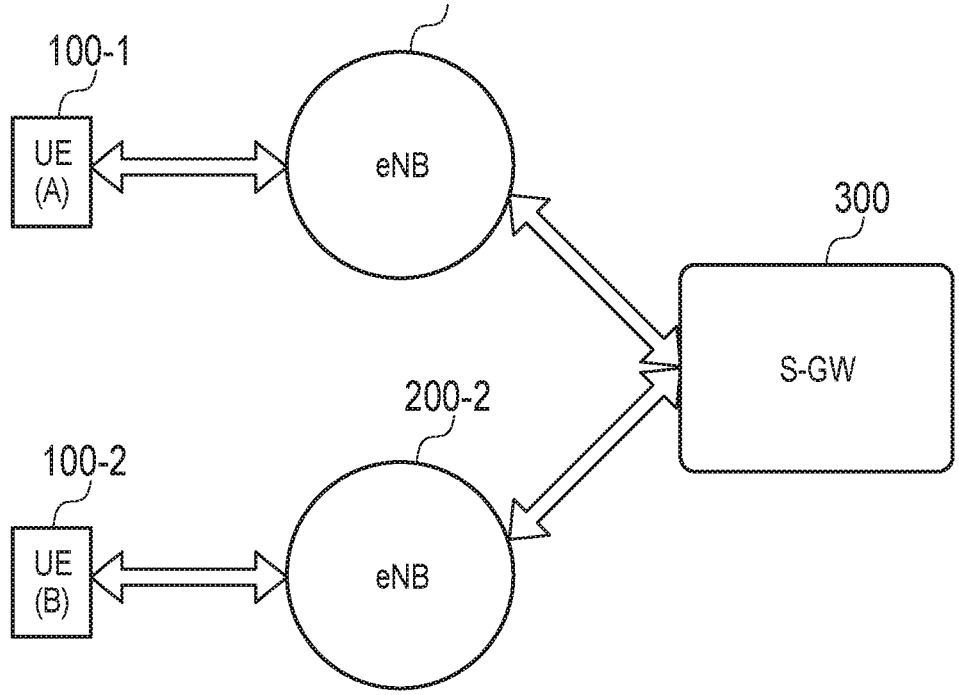
FIG. 6 is a diagram showing a data path in cellular communication.

FIG. 6 is a diagram showing a data path in the cellular communication. Here, the case is shown in which the cellular communication is performed between the UE 100-1 that establishes a connection with the eNB 200-1 and the UE 100-2 that establishes a connection with the eNB 200-2. It is noted that the data path indicates a transfer path of user data (user plane).

As shown in FIG. 6, the data path of the cellular communication passes through the core network. In particular, the data path is set to pass through the eNB 200-1, the S-GW 300, and the eNB 200-2.

Figure 7:
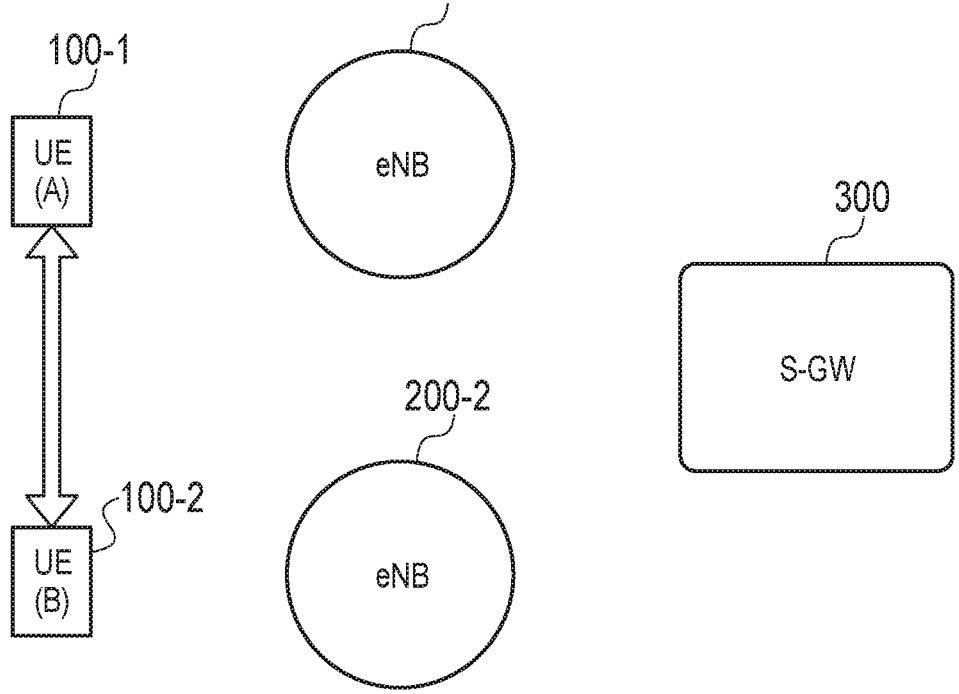
FIG. 7 is a diagram showing a data path in D2D communication.

FIG. 7 is a diagram showing a data path in the D2D communication. Here, the case is shown in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Further, the UE 100 has a (Discoverable) function of being discovered by the other UE 100.

As shown in FIG. 7, the data path of the D2D communication does not pass through the core network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load on the core network and a battery consumption amount of the UE 100 are reduced, for example.

(Parameter Characterizing Property of D2D Data)

Next, a parameter characterizing a property of D2D data that is data to be transmitted in the D2D communication will be described with reference to FIG. 8. FIG. 8 is a diagram for illustrating an example of a parameter that characterizes the property of the D2D data.

In the present embodiment, the D2D data is categorized in accordance with the parameter characterizing the property of the D2D data.

For example, as shown in FIG. 8, the D2D data may be categorized by using a QCI (QoS Class identifier) defined in the cellular communication.

Specifically, as the parameter that characterizes the property of the D2D data, there are an identifier of a QoS class (QCI: QoS Class Identifier), a resource type (Resource Type), a priority (Priority), a permitted delay time (Packet Delay Budget), and a permitted packet loss rate (Packet Error Loss Rate).

Further, the parameter of the QCI may be associated with an application (service content) used for the D2D communication. For example, in an application used for transmitting D2D data in Conversational Voice, the parameter of the QCI may be associated with "1".

Further, the D2D data may be categorized by using some QCIs defined in the cellular communication, a new QCI dedicated to D2D communication may be defined in order to categorize the D2D data.

(D2D-Use Bearer)

Figure 9:
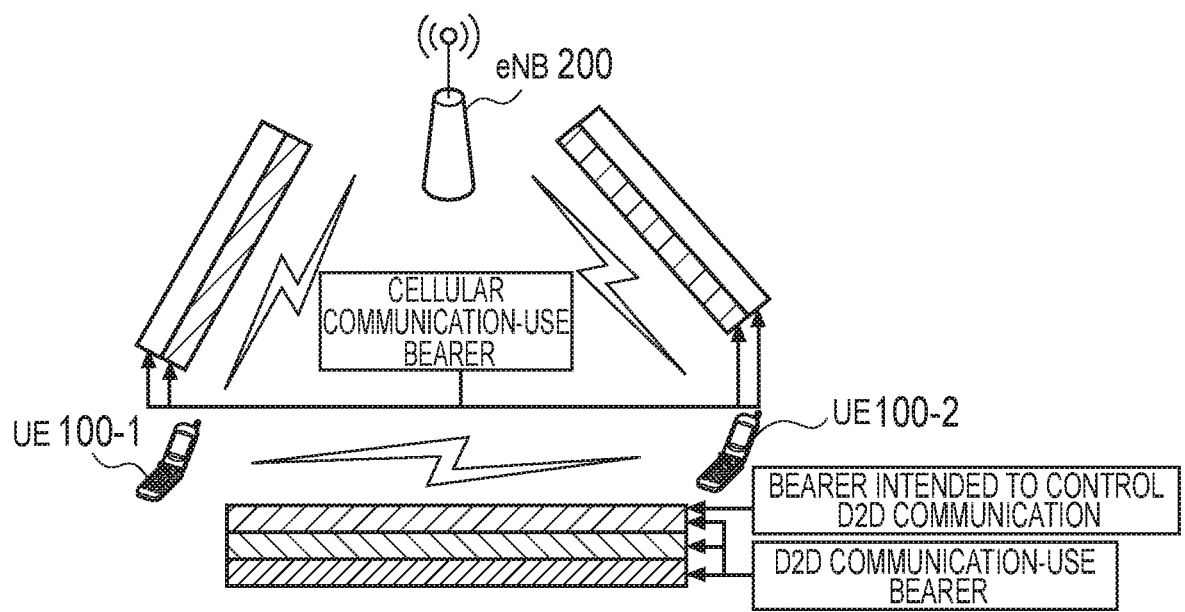
FIG. 9 is an explanatory diagram for illustrating radio bearer used in D2D communication.

Next, by using FIG. 9, a radio bearer used in the D2D communication will be described. FIG. 9 is an explanatory diagram for illustrating a radio bearer used in D2D communication.

As shown in FIG. 9, between the UE 100-1 and the UE 100-2 that is a partner terminal of D2D communication, a radio bearer used for D2D communication (hereinafter, referred to as "D2D-use bearer") is established. Here, the D2D-use bearer is directly established between the UE 100-1 and the UE 100-2, not a radio bearer indirectly established via the eNB 200 between the UE 100-1 and the UE 100-2, for example. That is, the D2D-use bearer is not a radio bearer via the eNB 200.

The D2D-use bearer includes a D2D data-use bearer used for transmitting D2D data that is data in D2D communication and a D2D control-use bearer used for controlling D2D communication.

It is possible to establish the D2D-use bearer co-existing with the radio bearer used for the cellular communication that is communication via the eNB 200. Therefore, the UE 100 is capable of receiving, via the radio bearer, information indicating the radio resource assigned to the UE 100 in accordance with the parameter that characterizes the property of the D2D data.

The D2D data-use bearer is established in accordance with the parameter characterizing the property of the D2D data.

When parameters characterizing the property of respective D2D bearers of a plurality of pieces of D2D data differ from one another, it is possible to establish a plurality of pieces of D2D data-use bearers in accordance with the parameters respectively corresponding to the plurality of pieces of D2D data. For example, in order to transmit first D2D data in which the parameter of QCI is "1" and second D2D data in which the parameter of QCI is "3", a first D2D data-use bearer for transmitting the first D2D data and a second D2D data-use bearer for transmitting the second D2D data may be established.

The D2D control-use bearer is established when the D2D communication is started. In the present embodiment, the D2D control-use bearer is used for transmitting and/or receiving keep-alive information for confirming that the D2D communication connection between the UE 100-1 and the UE 100-2 is effective. For example, when transmitting the D2D data via the D2D data-use bearer, the UE 100 transmits also the keep-alive information via the D2D control-use bearer.

(Schematic Operation of Controller of UE 100)

Figure 10:
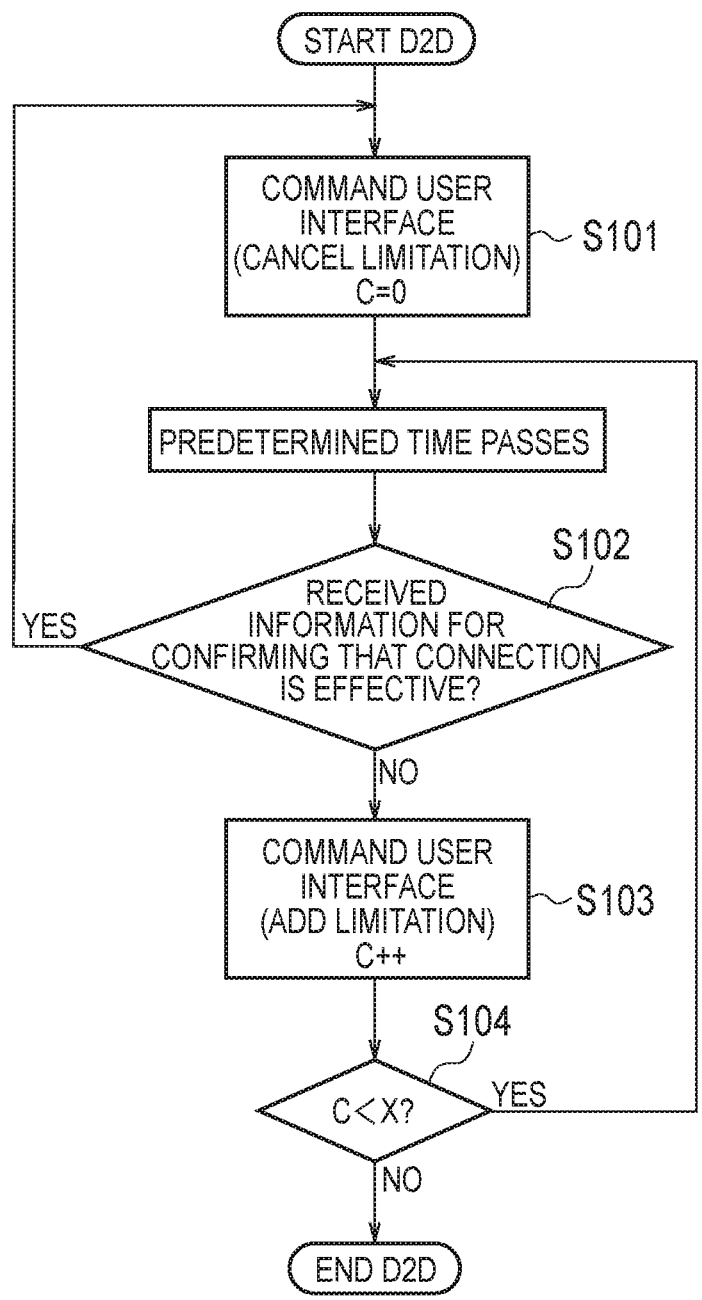
FIG. 10 is a sequence diagram showing an operation example of a controller of the UE 100 according to an embodiment.

Next, a schematic operation of the controller of the UE 100 according to the embodiment will be described by using FIG. 10. FIG. 10 is a sequence diagram showing an operation example of the controller of the UE 100 according to the embodiment.

The controller of the UE 100 includes a radio controller that controls the radio transceiver 110 and a user interface controller that controls the user interface 120.

As shown in FIG. 10, in step 101, the radio controller instructs the user interface controller to display a screen displayed when the D2D communication connection is effective. For example, when there is added limitation on the size and/or density of a text, the radio controller instructs returning to a default. When there is a limitation that as a numerical value C becomes larger, the size and/or density of a text is changed, the radio controller instructs C=0.

The radio controller may notify, instead of the above-described instruction, the user interface controller that the keep-alive information is received.

The user interface controller controls, on the basis of the above-described instruction or notification, to display a screen displayed when the D2D communication connection is effective.

In step 102, after a predetermined time passes since step 101, the radio controller determines whether or not the keep-alive information that is information for confirming that the D2D communication connection is effective is received. When the keep-alive information is received, the radio controller executes a process in step 101. On the other hand, when the keep-alive information is not received, the radio controller executes a process in step 103.

In step 103, the radio controller instructs displaying a screen displayed when the D2D communication connection is not effective. For example, the radio controller instructs addition of a limitation on the size and/or density of a text. When there is a limitation that as a numerical value C becomes larger, the size and/or density of a text is changed, the radio controller instructs addition of a predetermined value to C. For example, a limitation that the size of a text becomes smaller in accordance with the size of the numerical value C may be imposed.

The radio controller may notify, instead of the instruction in step 103, the user interface controller that the keep-alive information is not received.

The radio controller controls, on the basis of the instruction or the notification in step 103, to display a screen displayed when the D2D communication connection is not effective. Therefore, the controller (the radio controller and the user interface controller) changes the display of the user interface of the UE 100 when not receiving the keep-alive information for a predetermined period.

In step 104, when the numerical value C is smaller than a predetermined value, the radio controller executes again the process in step 102 after a predetermined period passes. On the other hand, when the numerical value C is larger than the predetermined value, the radio controller executes control to end the D2D communication.

Instead of the size of the numerical value C, when a time period passing since not receiving the keep-alive information exceeds a predetermined value, the radio controller may execute similar control.

The radio controller instructs the user interface controller to display indicating the end of the D2D communication. The user interface controller controls to display a screen indicating the end of the D2D communication.

(Schematic Operation of Mobile Communication System According to Embodiment)

Figure 11:
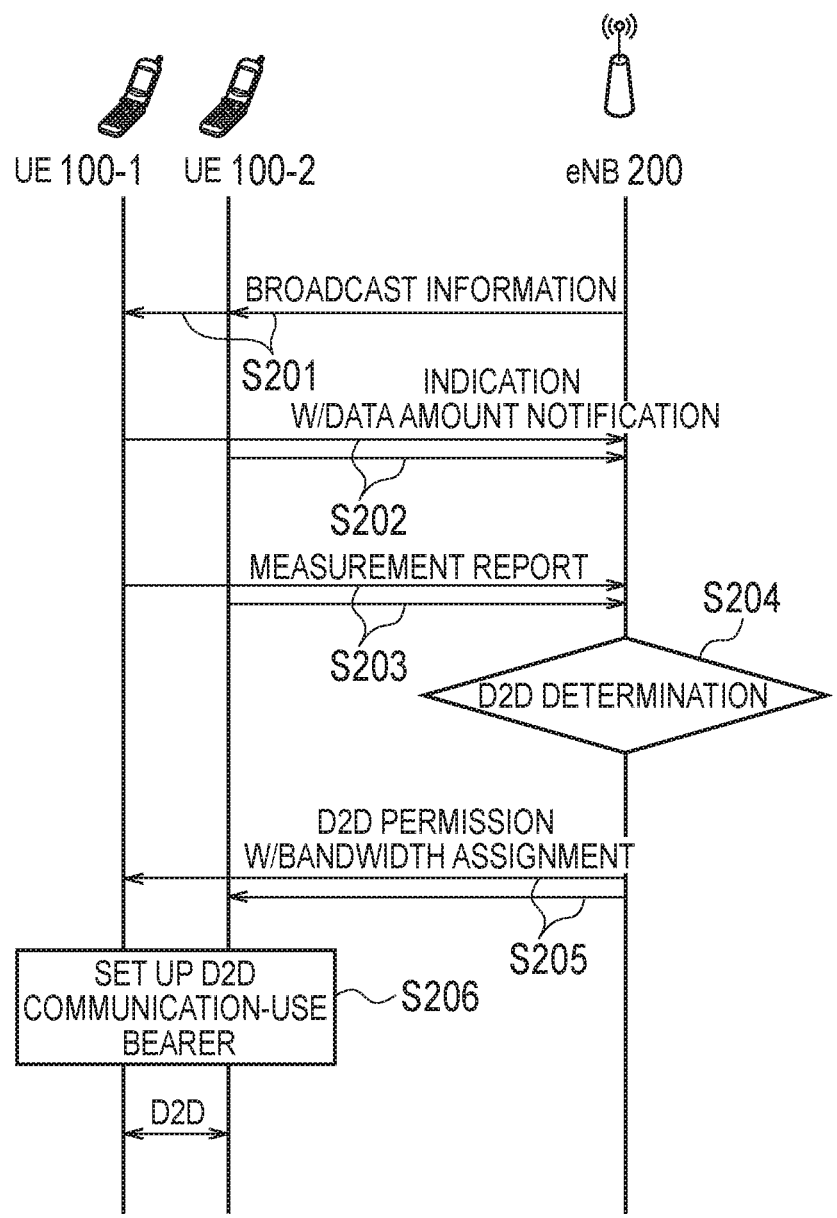
FIG. 11 is a sequence diagram showing an operation example of a mobile communication system according to the embodiment.

Next, a schematic operation of a mobile communication system according to the embodiment will be described by using FIG. 11. FIG. 11 is a sequence diagram showing an operation example of the mobile communication system according to the embodiment.

As shown in FIG. 11, in step 201, the eNB 200 broadcasts broadcast information. Each of the UE 100-1 and the UE 100-2 receives the broadcast information from the eNB 200.

The broadcast information is information on the parameter that characterizes the property of the D2D data. Each of the UE 100-1 and the UE 100-2 determines, on the basis of the information on the parameter that characterizes the property of the D2D data, the parameter that characterizes the property of the D2D data transmitted by each of the UE 100-1 and the UE 100-2.

In step 202, each of the UE 100-1 and the UE 100-2 transmits an instruction (Indication) for requesting the D2D communication, to the eNB 200. The eNB 200 receives the instruction for requesting the D2D communication from each of the UE 100-1 and the UE 100-2.

Each of the UE 100-1 and the UE 100-2 transmits, together with the request, information indicating the determined parameter. When there are a plurality of pieces of D2D data, information indicating respective parameters characterizing the property of each of the D2D data is transmitted.

Further, each of the UE 100-1 and the UE 100-2 may transmit, together with the request, information indicating a data amount of the D2D data (data amount notification).

The eNB 200 stores the information transmitted together with the request. It is noted that an identifier of the UE 100 from which the request is transmitted is stored together with the request. When also a partner terminal of D2D communication of the UE 100 from which the request is transmitted is transmitted, an identifier of the partner terminal is also stored.

In step 203, each of the UE 100-1 and the UE 100-2 transmits a measurement report (Measurement report) to the eNB 200. The eNB 200 receives the measurement report from each of the UE 100-1 and the UE 100-2.

In step 204, the eNB 200 determines whether or not to allow each of the UE 100-1 and the UE 100-2 to perform the D2D communication.

Specifically, the eNB 200 determines whether or not to allow the D2D communication to be performed on the basis of at least one of a received signal strength from the eNB 200 included in the measurement report, the parameter that characterizes the property of the D2D data, and the data amount of the D2D data. When determining that the UE 100-1 and the UE 100-2 are allowed to perform the D2D communication, the eNB 200 executes a process in step 205. On the other hand, when determining that the UE 100-1 and the UE 100-2 are not allowed to perform the D2D communication, the eNB 200 transmits information indicating that the D2D communication is not permitted to each of the UE 100-1 and the UE 100-2.

In step 205, the eNB 200 transmits to each of the UE 100-1 and the UE 100-2 information indicating that the D2D communication is permitted. In the information indicating that the D2D communication is permitted, information indicating a radio resource necessary for establishing a D2D communication-use bearer between the UE 100-1 and the UE 100-2 is included.

Further, the eNB 200 transmits, together with the information indicating that the D2D communication is permitted, information indicating assignment of a D2D communication-use radio resource (bandwidth assignment).

The eNB 200 assigns the radio resource to each of the UE 100-1 and the UE 100-2, on the basis of the respective parameters characterizing the property of the D2D data received in step 202. Specifically, when the parameter indicates the D2D data having a high priority, the eNB 200 assigns more radio resources to the UE 100 having the D2D data of the parameter. On the other hand, when the parameter indicates the D2D data having a low priority, the eNB 200 assigns less radio resources to the UE 100 having the D2D data of the parameter.

It is noted that on the basis not only of the parameter but also of the data amount notification received in step 202, the eNB 200 may assign the radio resource to each of the UE 100-1 and the UE 100-2.

In step 206, the UE 100-1 and the UE 100-2 establish the D2D-use bearer between the UE 100-1 and the UE 100-2. Specifically, each of the UE 100-1 and the UE 100-2 establishes the D2D data-use bearer in accordance with the transmitted parameter that characterizes the property of the D2D data. Each of the UE 100-1 and the UE 100-2 may establish the D2D control-use bearer.

Each of the UE 100-1 and the UE 100-2 uses the radio resource assigned in accordance with the D2D data-use bearer to transmit the D2D data via the D2D data-use bearer.

It is noted that when the eNB 200 controls the D2D communication, the radio bearers are set between the eNB 200 and the UE 100-1 and between the eNB 200 and the UE 100-2, the eNB 200 assigns the radio resource to each of the UE 100-1 and the UE 100-2 in accordance with the parameter transmitted from each of the UE 100-1 and the UE 100-2, and transmits information indicating the assigned radio resource, via the radio bearer, to each of the UE 100-1 and the UE 100-2. Each of the UE 100-1 and the UE 100-2 uses the radio resource received from the eNB 200 to perform the D2D communication.

(Schematic Operation of Mobile Communication System According to First Modification of Embodiment)

Figure 12:
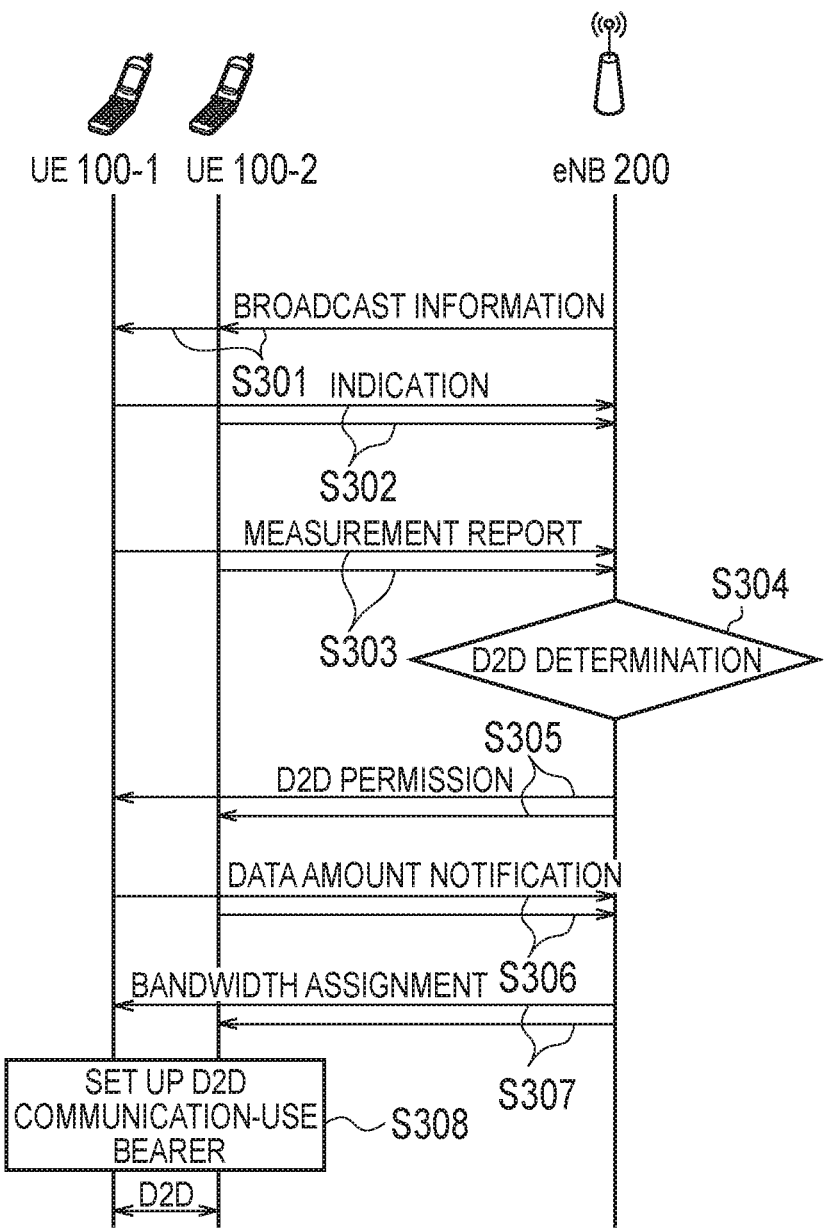
FIG. 12 is a sequence diagram showing an operation example of a mobile communication system according to a first modification of the embodiment.

Next, by using FIG. 12, a schematic operation of a mobile communication system according to a first modification of the embodiment will be described. FIG. 12 is a sequence diagram showing an operation example of the mobile communication system according to the first modification of the embodiment. It is noted that a description will be provided while focusing on a portion different from the above-described embodiment, and a description of a similar portion will be omitted, where necessary.

In the above-described embodiment, the UE 100 transmits, together with the instruction (Indication) for requesting the D2D communication, the information indicating the data amount of the D2D data; however, in the present modification, the information indicating the D2D data amount is transmitted after the D2D communication is permitted.

Step 301 in FIG. 12 corresponds to step 201 in the first embodiment.

In step 302, each of the UE 100-1 and the UE 100-2 transmits an instruction (Indication) for requesting the D2D communication, to the eNB 200. The eNB 200 receives the instruction for requesting the D2D communication from each of the UE 100-1 and the UE 100-2. Here, each of the UE 100-1 and the UE 100-2 does not transmit the information indicating the D2D data amount.

Steps 303 and 304 correspond to steps 203 and 204 in the first embodiment.

In step 305, the eNB 200 transmits to each of the UE 100-1 and the UE 100-2 information indicating that the D2D communication is permitted. In the information indicating that the D2D communication is permitted, information indicating a radio resource necessary for establishing a D2D communication-use bearer between the UE 100-1 and the UE 100-2 is included. Here, the eNB 200 does not transmit the information indicating assignment of the D2D communication-use radio resource (bandwidth assignment).

In step 306, each of the UE 100-1 and the UE 100-2 transmits information indicating a data amount of the D2D data (data amount notification) to the eNB 200. The eNB 200 receives the data amount notification.

In step 307, the eNB 200 transmits to each of the UE 100-1 and the UE 100-2 the information indicating assignment of the D2D communication-use radio resource (bandwidth assignment). Each of the UE 100-1 and the UE 100-2 receives the bandwidth assignment.

It is noted that in much the same way as in the first embodiment, the eNB 200 assigns the radio resource to each of the UE 100-1 and the UE 100-2, on the basis of the respective parameters characterizing the property of the D2D data and the data amount notification.

Step 308 corresponds to step 206 in the first embodiment.

(Schematic Operation of Mobile Communication System According to Second Modification of Embodiment)

Figure 13:
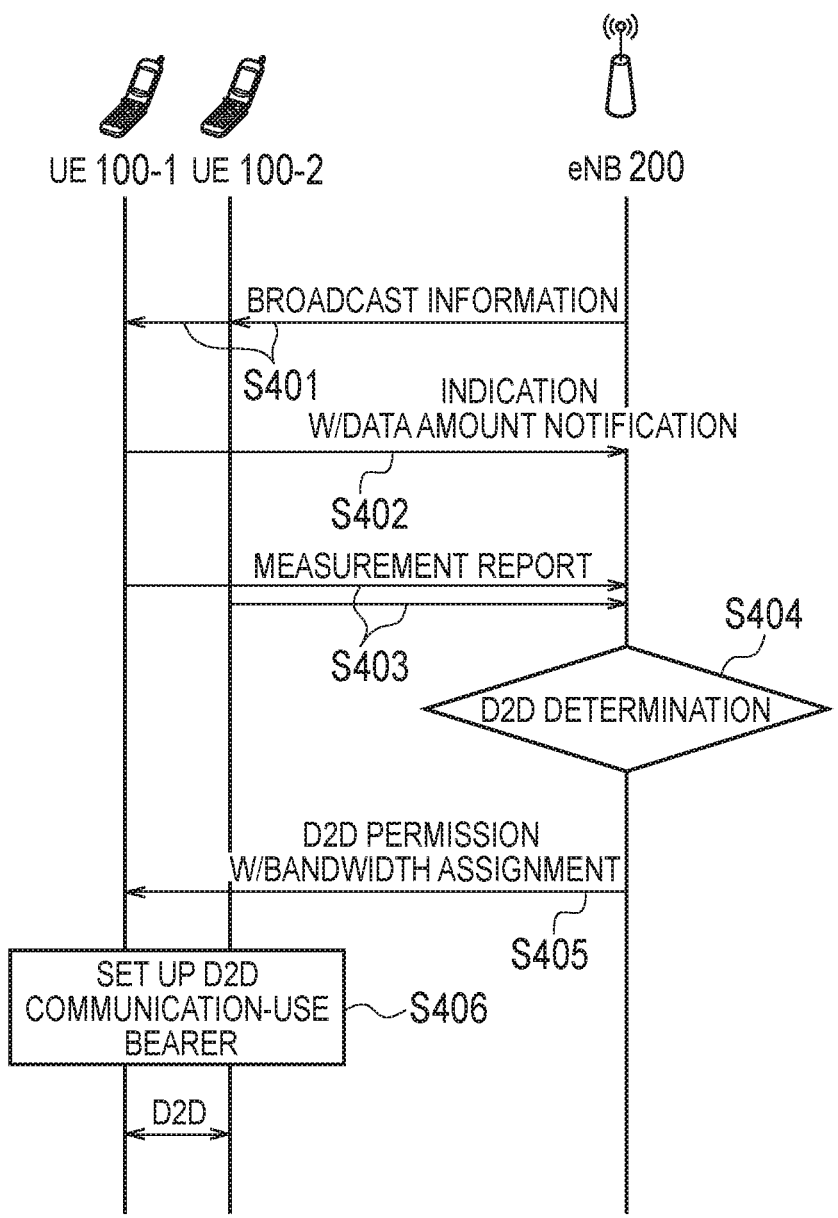
FIG. 13 is a sequence diagram showing an operation example of a mobile communication system according to a second modification of the embodiment.

Next, by using FIG. 13, a schematic operation of a mobile communication system according to a second modification of the embodiment will be described. FIG. 13 is a sequence diagram showing an operation example of the mobile communication system according to the second modification of the embodiment. It is noted that a description will be provided while focusing on a portion different from the above-described embodiment, and a description of a similar portion will be omitted, where necessary.

In the present modification, there is an anchor UE 100-1 representing a D2D group configured by the UE 100 that performs the D2D communication. The anchor UE 100-1 is UE that communicates with the eNB 200 as a representative of the D2D group.

Step 401 corresponds to step 201 in the first embodiment.

Step 402 corresponds to step 202 in the first embodiment. However, only the anchor UE 100-1 transmits the instruction for requesting the D2D communication to the eNB 200. The UE 100-2 transmits in advance information indicating the parameter that characterizes the property of the D2D data transmitted by the UE 100-2 and information indicating the data amount of the D2D data, to the anchor UE 100-1. The anchor UE 100-1 transmits, together with the instruction for requesting the D2D communication, the information indicating the parameter that characterizes the property of the D2D data transmitted by each of the anchor UE 100-1 and the UE 100-2, and the information indicating the data amount of the D2D data of the anchor UE 100-1 and the UE 100-2, to the eNB 200.

Steps 403 and 404 correspond to steps 203 and 204 in the first embodiment.

Step 405 corresponds to step 205 in the first embodiment. However, only the anchor UE 100-1 receives the information indicating that the D2D communication is permitted, from the eNB 200.

Step 406 corresponds to step 206 in the first embodiment.

(Schematic Operation of Mobile Communication System According to Third Modification of Embodiment)

Next, by using FIG. 14, a schematic operation of a mobile communication system according to a third modification of the embodiment will be described. FIG. 14 is a sequence diagram showing an operation example of the mobile communication system according to the third modification of the embodiment. It is noted that description will be provided while focusing a portion different from the embodiment and each modification described above, and description of a similar portion will be omitted, where necessary.

The present modification differs from the above-described first modification in that there is an anchor UE 100-1.

Step 501 corresponds to step 301 in the first modification.

Step 502 corresponds to step 302 in the first modification. However, only the anchor UE 100-1 transmits the instruction for requesting the D2D communication to the eNB 200.

The UE 100-2 transmits in advance information indicating the parameter that characterizes the property of the D2D data transmitted by the UE 100-2, to the anchor UE 100-1.

The anchor UE 100-1 transmits, together with the instruction for requesting the D2D communication, the information indicating the parameter that characterizes the property of the D2D data transmitted by each of the anchor UE 100-1 and the UE 100-2, to the eNB 200.

Steps 503 and 504 correspond to steps 303 and 304 in the first modification.

Step 505 corresponds to step 305 in the first modification. However, only the anchor UE 100-1 receives the information indicating that the D2D communication is permitted, from the eNB 200.

Step 506 corresponds to step 306 in the first modification. However, only the anchor UE 100-1 transmits to the eNB 200 the information indicating the data amount of the D2D data of the anchor UE 100-1 and the UE 100-2.

It is noted that the UE 100-2 transmits in advance the information indicating the data amount of the D2D data, to the anchor UE 100-1.

Step 507 corresponds to step 307 in the first modification. However, only the anchor UE 100-1 receives from the eNB 200 the information indicating the assignment of the D2D communication-use radio resource (bandwidth assignment).

Step 508 corresponds to step 308 in the first modification of embodiment.

Conclusion of Embodiment

In the present embodiment, the UE 100 (controller) establishes the D2D data-use bearer in accordance with the parameter characterizing the property of the D2D data. The radio resource assigned in accordance with the parameter is used to thereby transmit the D2D data corresponding to the parameter via the D2D data-use bearer according to the parameter. As a result, the D2D communication-use radio resource is assigned in accordance with the parameter, and thus, when more radio resources are assigned to the UE 100 having the D2D data of the parameter having a high priority, the UE 100 having the D2D data to be preferentially transmitted is capable of preferentially transmitting the D2D data to be preferentially transmitted.

Further, in the present embodiment, when the UE 100 has respective parameters of a plurality of pieces of D2D data transmitted by the D2D communication differing from one another, a plurality of pieces of D2D data-use bearers are established to the UE 100 in accordance with the parameters of the plurality of pieces of D2D data. As a result, even when the UE 100 has a plurality of pieces of D2D data to be transmitted in the D2D communication, a D2D transmission-use bearer according to the respective parameters are established, and thus, when the radio resources assigned according to the respective parameters, it is possible to preferentially transmit the D2D data to be preferentially transmitted.

Further, in the present embodiment, the UE 100 (controller) further establishes a D2D control bearer used for controlling the D2D communication. The UE 100 performs control of transmitting and/or receiving, via the D2D control bearer, the keep-alive information for confirming that the D2D communication connection between the UEs 100 is effective. As a result, the UE 100 is capable of determining whether the D2D communication connection is effective.

Further, in the present embodiment, the UE 100 (controller) changes the display of the user interface 120 of the UE 100 when not receiving the keep-alive information for a predetermined period. As a result, when visually confirming the display of the user interface 120, a user of the UE 100 is capable of easily recognizing that the keep-alive information for confirming that the D2D communication connection is effective is not received.

Further, in the present embodiment, the parameter is at least one of the identifier of the QoS class, the priority, the permitted delay time, and the permitted packet loss rate. As a result, it is possible to determine the D2D data to be preferentially transmitted.

Further, in the present embodiment, the UE 100 (controller) establishes, co-existing with the D2D transmission-use bearer, the radio bearer. The UE 100 (radio transceiver 110) receives, via the radio bearer, the information indicating a radio resource assigned by the eNB 200 in accordance with the parameter.

Other Embodiments

As described above, the present disclosure has been described with the embodiments. However, it should not be understood that those descriptions and drawings constituting a part of this disclosure limit the present disclosure. From this disclosure, a variety of alternate embodiments, examples, and applicable techniques will become apparent to one skilled in the art.

For example, in the above-described embodiment, the eNB 200 controls the D2D communication; however, the eNB 200 may not need to control the D2D communication. In this case, when the UE 100-1 and the UE 100-2 are not connected to the eNB 200, either one of the UE 100-1 or the UE 100-2 performs the scheduling for assigning the radio resource for the D2D communication. Here, description proceeds with an assumption that the UE 100-1 performs the scheduling.

The UE 100-1 receives the parameter that characterizes the property of the D2D data transmitted by the UE 100-2, from the UE 100-2. The UE 100-1 assigns the radio resource used by the UE 100-1 and the UE 100-2 to transmit the D2D data in accordance with the parameter that characterizes the property of the D2D data transmitted by each of the UE 100-1 and the UE 100-2.

It is noted that when not knowing the parameter that characterizes the property of the D2D data, the UE 100-1 and the UE 100-2 may inquire the network. When each of the UE 100-1 and the UE 100-2 is not connected with the eNB 200 (that is, in the idle state), the parameter may be determined on the basis of at least one of past information related with the D2D data and an application used for the D2D communication. Specifically, when new D2D data transmitted by using the D2D communication is the same or the same in classification as the D2D data transmitted in the past, the UE 100 determines a parameter that characterizes the property of the D2D data transmitted in the past, as a new parameter that characterizes the property of the D2D data transmitted by using the D2D communication.

Further, for example, when the application used for the D2D communication requires a real-time performance, the UE 100 determines a parameter that characterizes the property of the D2D data transmitted by the application, as a parameter having a high priority, and when the application used for the D2D communication is a normal data transfer, the UE 100 determines a parameter that characterizes the property of the D2D data transmitted by the application, as a parameter having a low priority. Thus, the UE 100 may determine, in accordance with the types of application used for the D2D communication, the parameter that characterizes the property of the D2D data transmitted by using the D2D communication. As a result, even when the UE 100 is not connected to the eNB 200, it is possible to determine the parameter that characterizes the property of the D2D data, and the UE 100 is capable of assigning the radio resource in accordance with the parameter.

Further, in the above-described embodiment, the broadcast information may be notified to the UE 100 by an AS (Access Stratum) message or may be notified to the UE 100 by an NAS (Non-Access Stratum) message.

Further, in the above-described embodiment, the UE 100 transmits and/or receives, via the D2D control bearer, the keep-alive information in order to confirm the effectiveness of the D2D communication connection between the UEs 100; however, this is not limiting. For example, the UE 100 may transmit and/or receive a D2D communication-use reference signal without establishing the D2D control-use bearer. The UE 100 determines that the D2D communication connection is effective by receiving the reference signal from the partner terminal of the D2D communication. It is noted that the UE 100 may transmit and receive the D2D communication-use reference signal after establishing the D2D control-use bearer to thereby determine whether or not the D2D communication connection is effective, and perform other control on the D2D communication via the D2D control-use bearer.

Further, in the above-described embodiment, the radio bearer established between the UE 100 and the eNB 200 and the D2D-use bearer established between the UEs 100 may be mapped to the same physical channel, and may be mapped to a different physical channel.

INDUSTRIAL APPLICABILITY

Based on the user terminal, processor, and base station according to the present disclosure, it is possible to preferentially transmit the D2D data to be preferentially transmitted.

The invention claimed is:

1. A communication control method, comprising:
transmitting to a base station, by a user equipment, first information including a priority of a data packet to be transmitted from the user equipment via direct communication in which the data packet is transmitted to another user equipment without passing through the base station, the first information assisting the base station to schedule transmission resources for the direct communication;
receiving from the base station, by the user equipment, second information indicating transmission resources for the direct communication scheduled by the base station;
configuring, by the user equipment, a plurality of data paths in accordance with a priority of each of a plurality of data packets to be transmitted by the direct communication, on a basis of the second information; and
transmitting, by the user equipment, each of the plurality of data packets via a respective configured data path.

2. A user equipment comprising:
a transmitter configured to transmit to a base station, first information including a priority of a data packet to be transmitted from the user equipment via direct communication in which the data packet is transmitted to another user equipment without passing through the base station, the first information assisting the base station to schedule transmission resources for the direct communication;
a receiver configured to receive from the base station, second information indicating transmission resources for the direct communication scheduled by the base station; and
a controller configured to configure a plurality of data paths in accordance with a priority of each of a plurality of data packets to be transmitted by the direct communication, on a basis of the second information, wherein the transmitter is further configured to transmit each of the plurality of data packets via a respective configured data path.

3. An apparatus for a user equipment, the apparatus comprising:
at least one processor;
a memory operatively coupled to the at least one processor; and
instructions stored in the memory and executable by the at least one processor to cause the user equipment to:
transmit to a base station, first information including a priority of a data packet to be transmitted from the user equipment via direct communication in which the data packet is transmitted to another user equipment without passing through the base station, the first information assisting the base station to schedule transmission resources for the direct communication;
receive from the base station, second information indicating transmission resources for the direct communication scheduled by the base station;
configure a plurality of data paths in accordance with a priority of each of a plurality of data packets to be transmitted by the direct communication, on a basis of the second information; and
transmit each of the plurality of data packets via a respective configured data path.

* * * * *